(12) United States Patent
Qin (10) Patent No.: US 9,686,679 B2
(45) Date of Patent: Jun. 20, 2017

(54) TRANSMISSION OF BEACON MESSAGE (71) Applicant: Alibaba Group Holding Limited, Grand Cayman (KY)

(72) Inventor: Jian Qin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/673,578

(22) Filed: Mar. 30, 2015

(65) Prior Publication Data
US 2015/0289133 A1 Oct. 8, 2015

(30) Foreign Application Priority Data
Apr. 4, 2014 (CN) .......................... 2014 1 0136738

(51) Int. Cl.
*H04W 12/04* (2009.01)
*H04L 9/08* (2006.01)
*H04W 12/02* (2009.01)
*H04W 12/12* (2009.01)
*H04L 9/12* (2006.01)
*H04L 29/06* (2006.01)

(52) U.S. Cl.
CPC .......... *H04W 12/04* (2013.01); *H04L 9/0819* (2013.01); *H04L 9/12* (2013.01); *H04W 12/02* (2013.01); *H04W 12/12* (2013.01); *H04L 63/0428* (2013.01); *H04L 2209/24* (2013.01); *H04L 2209/80* (2013.01)

(58) Field of Classification Search
CPC .................................................... H04W 12/06
See application file for complete search history.

(56) References Cited

U.S. PATENT DOCUMENTS

| 6,813,358 B1 * | 11/2004 | Di Crescenzo ..... H04L 63/0428 380/277 |
| 8,572,700 B2 * | 10/2013 | Ptasinski ................. H04L 63/12 726/5 |
| 8,953,794 B1 * | 2/2015 | Graube ................. H04W 12/02 380/44 |

(Continued)

FOREIGN PATENT DOCUMENTS

CN WO2008141992 A1 * 11/2008 ............... H04L 9/08

OTHER PUBLICATIONS

PCT Search Report and Written Opinion mailed Jul. 9, 2015 for PCT application No. PCT/US2015/023395, 10 pages.

*Primary Examiner* — Kambiz Zand
*Assistant Examiner* — Thanh Le
(74) *Attorney, Agent, or Firm* — Lee & Hayes, PLLC (57) ABSTRACT

Methods and systems of transmitting a beacon message. Implementations of the present disclosure include determining, by a computing device based on a predetermined algorithm, an encryption method using a current time as a parameter. The computing device may encrypt a beacon message using the determined encryption method to obtain an encrypted beacon message. The computing device may further generate a radio frame including the encrypted beacon message and information associated with a decryption computing device, and transmit the radio frame to a mobile device. Implementations of this present disclosure avoid leaking users' sensitive information, and therefore protect users' privacy as well as improve safe uses of beacon transmission.

12 Claims, 5 Drawing Sheets

(56) References Cited

U.S. PATENT DOCUMENTS

| | | | |
|---|---|---|---|
| 2003/0099360 A1* | 5/2003 | Hoang | H04L 9/302 380/277 |
| 2004/0003250 A1 | 1/2004 | Kindberg et al. | |
| 2005/0268330 A1 | 12/2005 | Di Rienzo | |
| 2006/0039337 A1 | 2/2006 | Hodoshima | |
| 2006/0098610 A1 | 5/2006 | Sundberg et al. | |
| 2006/0268746 A1* | 11/2006 | Wijting | H04W 48/08 370/254 |
| 2008/0161011 A1 | 7/2008 | Babin et al. | |
| 2009/0138715 A1 | 5/2009 | Xiao et al. | |
| 2009/0328214 A1 | 12/2009 | Dawson | |
| 2010/0167697 A1 | 7/2010 | Ishikawa et al. | |
| 2010/0259450 A1 | 10/2010 | Kainulainen et al. | |
| 2011/0158409 A1 | 6/2011 | Sugawara et al. | |
| 2012/0189123 A1 | 7/2012 | Adachi et al. | |
| 2014/0254577 A1 | 9/2014 | Wright et al. | |

\* cited by examiner

TRANSMISSION OF BEACON MESSAGE

CROSS REFERENCE TO RELATED PATENT APPLICATIONS

This application claims priority to Chinese Patent Application No. 201410136738.0, filed on Apr. 4, 2014, entitled "Method and Device for Transmission of Beacon Message for Beacon-based Service," which is hereby incorporated by reference in its entirety.

TECHNICAL FIELD

This present disclosure relates to a communication network technology, more particularly, to a beacon data transmission.

BACKGROUND

With the popularity of smart phone technology, the mobile device has been deeply rooted in people's lives. For example, using mobile positioning technology, mobile devices provide users with personalized and localized services.

GPS (Global Positioning System) is currently a widely used positioning technology. However, when a GPS receiver is operating in a room, the room attenuates the signal and decreases accuracy of the GPS. Recently, indoor positioning technologies have been developed, such as WiFi (Wireless Fidelity), ZigBee, Bluetooth, and ultra wideband wireless communication network.

Beacons implement an indoor positioning technology and provide a promising solution for positioning inside of buildings. Beacons generate radio frames and transmit to mobile devices in a certain beacon signal region. However, since applications resided on the mobile devices may retrieve user sensitive information during communication between the beacons and the mobile devices, security has become an issue for commercializing the beacon technology.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-executable instructions as permitted by the context above and throughout the present disclosure.

Implementations of this present disclosure relate to methods for transmitting a beacon message. The implementations may include determining, by one or more processors of a beacon based on a predetermined algorithm, an encryption method using a current time as a parameter. The beacon may encrypt an identifier (ID) of the beacon using the determined encryption method to obtain a beacon message including an encrypted ID of the beacon. The beacon may generate a radio frame including the beacon message and information associated with a decryption computing device, and transmit the radio frame to a mobile device.

Implementations of this present disclosure further relate to one or more computer-readable media storing computer-executable instructions that, when executed by one or more processors, instruct the one or more processors to perform acts. The acts may include determining, by a computing device based on a predetermined algorithm, a decryption method using a current time as a parameter. The computing device may receive an encrypted beacon message including an encrypted ID of a beacon from a mobile device. The computing device may decrypt the encrypted ID using the determined decryption method to obtain an ID of the beacon and provide a task corresponding to the ID of the beacon to the mobile device.

Implementations of this present disclosure further relate to a system including: one or more processors; and memory to maintain a plurality of components executable by the one or more processors. The plurality of components may include an encryption determination module, an encryption module, and a transmission module. The encryption determination module is configured to determine, based on a predetermined algorithm, an encryption method using a current time as a parameter. The encryption module is configured to encrypt an ID of a beacon using the determined encryption to obtain a beacon message including an encrypted ID of the beacon. The transmission module is configured to generate a radio frame including the beacon message and information associated with a decryption computing device, and transmit the radio frame to a mobile device.

Implementations of this present disclosure further relate to another system including: one or more processors; and memory to maintain a plurality of components executable by the one or more processors. The plurality of components may include a decryption determination module, an encrypted message receiving module, an encrypted message receiving module, a decryption module, and a task providing module. The decryption determination module is configured to determine, based on a predetermined algorithm, a decryption method using a current time as a parameter. The encrypted message receiving module is configured to receive a beacon message including an encrypted ID of a beacon from a mobile device. The decryption module is configured to decrypt the encrypted ID using the determined decryption method to obtain the ID of the beacon. The task providing module is configured to provide a task corresponding to the ID of the beacon to the mobile device.

Implementations of this present disclosure may generate time-varying encryption associated with the beacon ID such that an unauthorized malware cannot obtain a real and stable ID of the beacon. Therefore, it is difficult to counterfeit beacon IDs corresponding to services, which may involve users' sensitive information. This protects user interest and improves beacon network safety.

BRIEF DESCRIPTION OF THE DRAWINGS

The Detailed Description is described with reference to the accompanying figures. The use of the same reference numbers in different figures indicates similar or identical items.

DETAILED DESCRIPTION

Under conventional techniques, an identifier (ID) of a beacon is transmitted via an unencrypted message. Applications on the mobile device can obtain the ID. This provides an opportunity for malware. After a beacon ID is obtained by malicious software designers, they may lead customers to a fishing server and use false order/payment pages to obtain financial information of the customers.

Figure 1:
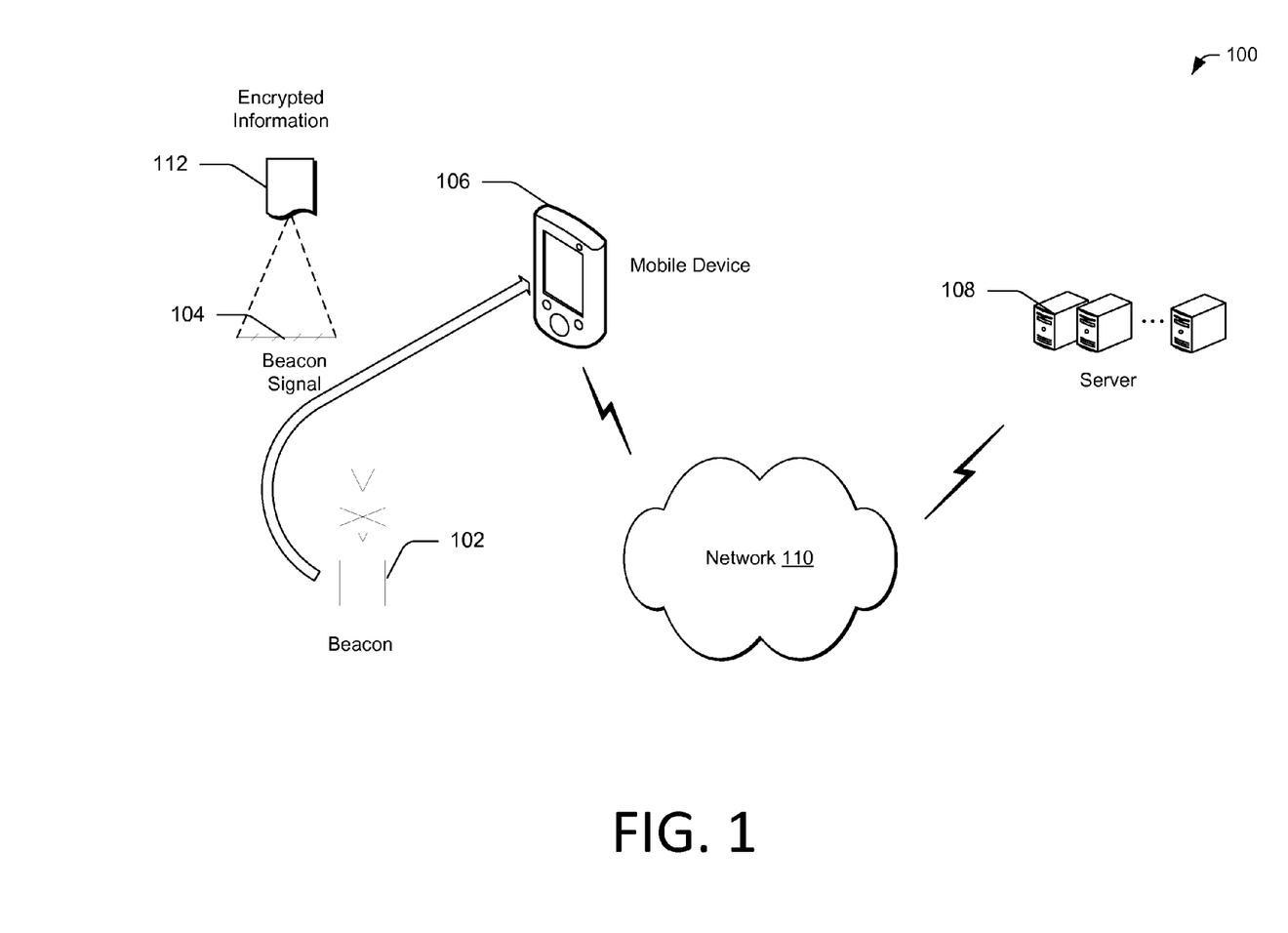
FIG. 1 is a schematic diagram of an illustrative computing environment, which enables transmission of a beacon message.

Implementations of this present disclosure relate to new methods of beacon data transmission to address problems of the conventional techniques. FIG. 1 is a schematic diagram of an illustrative computing environment 100, which enables transmission of a beacon message. The environment may include a beacon 102 that may generate a beacon signal 104, and a mobile device 106 that may receive the beacon signal 104 within a certain distance. In some implementations, the beacon signal 104 may include encrypted information 112 associated with the beacon 102 and/or a service associated with the beacon 102. The mobile device 106 and the beacon 102 may use various supported wireless protocols for data transmission. The mobile device 106 may further communicate with a server 108 via a network 110. In some implementations, the beacon 102 may be connected to a mobile communication network, network management servers, and/or other devices for data exchange. Types of mobile devices, protocols, or network structures of wireless communications used in the computing environment 100 are not limited by implementations of this present disclosure.

Implementation of this present disclosure may encrypt an ID of the beacon 102 to generate a beacon message including encryption information, such as an encrypted ID of the beacon 102. The beacon message may be encrypted using an encryption method, which may be modified with time. In some embodiments, after receiving the beacon message, the mobile device 106 may send the beacon message to the server 108. The server 108 may decrypt the beacon message and provide a corresponding service to a customer associated with the mobile device 106.

Figure 2:
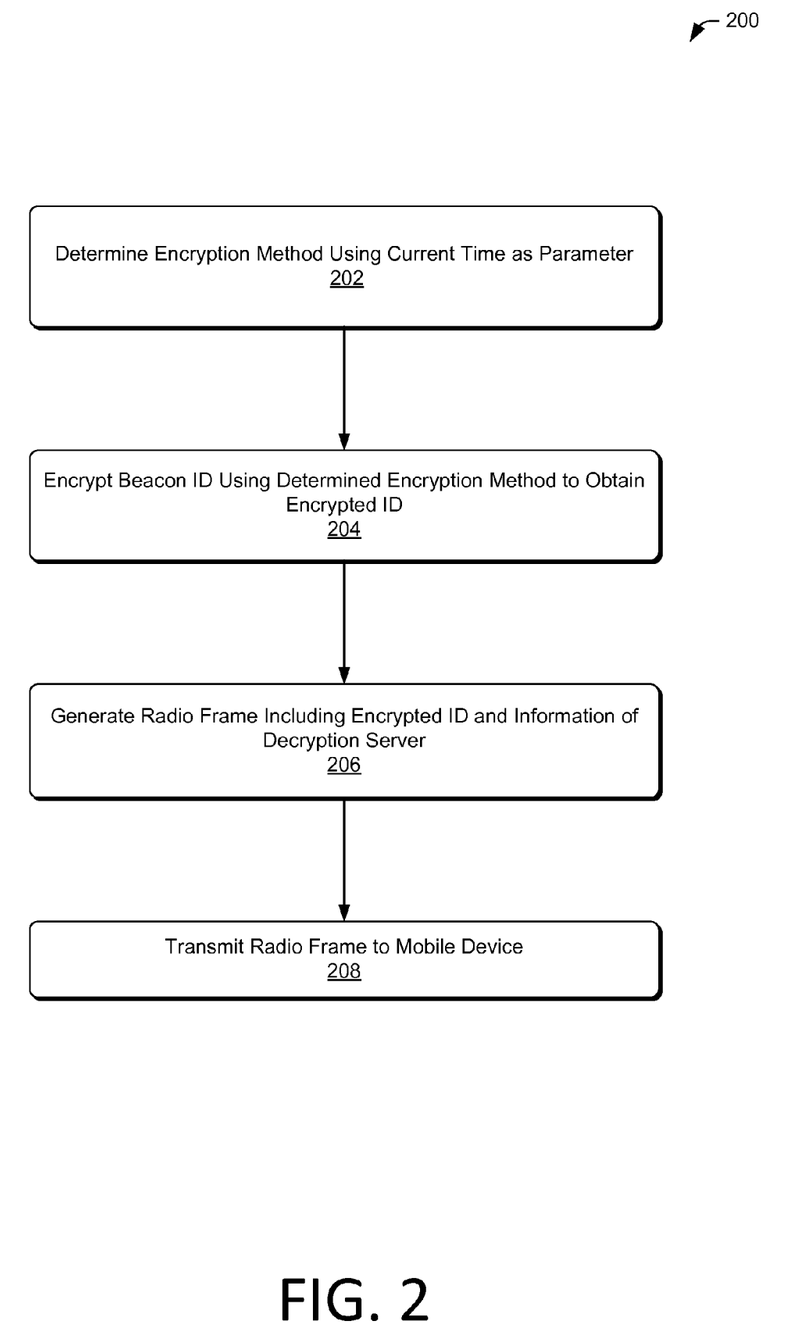
FIG. 2 is a flow chart of an illustrative process for transmitting a beacon message.

FIG. 2 is a flow chart of an illustrative process for transmitting a beacon message. At 202, the beacon 102 may determine, based on a predetermined algorithm, an encryption method using a current time as a parameter. In some implementations, the beacon 102 may determine the encryption algorithm using the current time. In some implementations, the beacon 102 may implement a predetermined encryption algorithm to determine a private key using the current time. Alternatively, the beacon 102 may determine the encryption algorithm and the private key using the current time. In other words, the encryption method may include encryption algorithm and/or the private key. In these instances, the server 108 may use the corresponding decryption methods to decrypt.

In some implementations, the beacon 102 may be installed in a certain location and an initial configuration may be performed after the installation. After the initial configuration, the beacon 102 may generate a radio frame based on the initial configuration and transmit the radio frame to a computing device such as the mobile device 106. In some implementations, encryption on the beacon 102 may be performed by the beacon 102, and decryption may be performed by the server 108. In some implementations, the server 108 and the beacon 102 may rarely communicate. In these instances, encryption and decryption may be implemented using a mutual reference to synchronize and/or modify the encryption method and the decryption method respectively. For example, the mutual reference may include a current time.

The beacon 102 and the server 108 may modify the encryption method and decryption method for a predetermined time period respectively. In some implementations, a modifying frequency may be determined based on various conditions. For example, the encryption method and decryption method may be modified after a fixed and/or variable interval of time. The encryption method and decryption method may be modified at the same time in a corresponding manner such that a message encrypted by the beacon 102 may be decrypted by the server 108.

For example, the beacon 102 and the server 108 may implement a predetermined symmetric encryption algorithm (e.g., using identical decryption and private key). The encryption and private key may be determined based on an algorithm using an integer of the current time (e.g., 9 for 9:45) as an input parameter. Accordingly, the beacon 102 and the server 108 may modify the encryption method and the decryption method every hour respectively.

In some implementations, the beacon 102 may preset N types of encryption methods. N is a natural number greater than 1. The beacon 102 may map the current time to M using a predetermined mapping algorithm and designate an encryption method corresponding to M as the determined encryption method. M is a nature number, greater than or equal to 1, and less than N. In some implementations, the server 108 may present N types decryption methods corresponding to the N types of encryption methods. In accordance with the same mapping algorithm, the server 108 may obtain number M decryption method, which may be implemented as a determined decryption method. Accordingly, the beacon 102 and the server 108 may have corresponding encryption and decryption methods respectively.

At 204, the beacon 102 may encrypt an ID of the beacon using the determined encryption method to obtain a beacon message including an encrypted ID of the beacon 102. In some implementations, a radio frame generated and/or transmitted by the beacon 102 may include the beacon message. In these instances, the radio frame may include a unique ID of the beacon 102 and other beacon information, such as a location code of the beacon 102 and equipment information of the beacon 102. The beacon 102 may encrypt the ID and/or other beacon information associated with the beacon 102 as long as the server 108 may correctly decrypt the encrypted information.

For example, a radio frame of the beacon 102 may include the following types of information: UUID, Major (e.g., main features of the beacon 102), Minor (e.g., minor features of the beacon 102), Measured Power (e.g., measurement of power). The UUID may be a 128-bit ID used to uniquely identify the beacon 102: the beacon ID. Major and Minor are 16-bit IDs, and are set by a beacon operator to carry additional ID information of the beacon 102. For example, a store may include location information in Major, and include a reference number and/or ID associated with the store. For example, if the Beacon 102 is installed in an appliance, the product models may be included in Major, and reference numbers corresponding to types of errors may be included in Minor.

Measured Power may represent a strength reference indicating signal strength generated by the beacon 102 when a distance between a transmission module of the Beacon and a receiver (e.g., the mobile device 106) is about a predetermined distance (e.g., one meter). The receiver may determine the distance based on the strength reference and signal strength that is currently received. During encryption, the beacon 102 may encrypt at least one of UUID, Major, or Minor associated with the beacon 102.

At 206, the beacon 102 may generate a radio frame including the encrypted ID and information associated with a decryption computing device (e.g., the server 108).

In some implementations, the mobile device 106 may receive a radio frame, retrieve an unencrypted ID of the beacon 102 from the radio frame, and perform a certain action corresponding to the unencrypted ID. In some implementations, the certain action may include locating and connecting with an address of a corresponding server. For example, the mobile device 106 may identify a corresponding server address of the server 108 and initiate a connection to the server 108. In other implementations, the ID of the beacon 102 may be encrypted, and the mobile device 106 may not be able to decrypt the encrypted ID. In these instances, the server 108 may be configured to decrypt the encrypted ID. Therefore, the information of the server 108 and the encrypted ID may be included in the radio frame such that the mobile device 106 may transmit the encrypted ID to an appropriate server (e.g., the server 108), which has a corresponding decryption method.

The beacon 102 may retrieve the information of the server 108 and package the information into a radio frame. In some implementations, the beacon 102 may retrieve the information using an application that is resided in the mobile device 106 and analyzes the radio frame. For example, the information may include an IP (Internet Protocol) address, a URL (Uniform Resource Locator) address, or a number the server 108 recognized by the application such that the mobile device 106 may identify and/or locate the server 108 accordingly.

At 208, the beacon 102 may transmit the radio frame to the mobile device 106, which identify the server 108 and transmit a request for decryption to the server 108.

Figure 3:
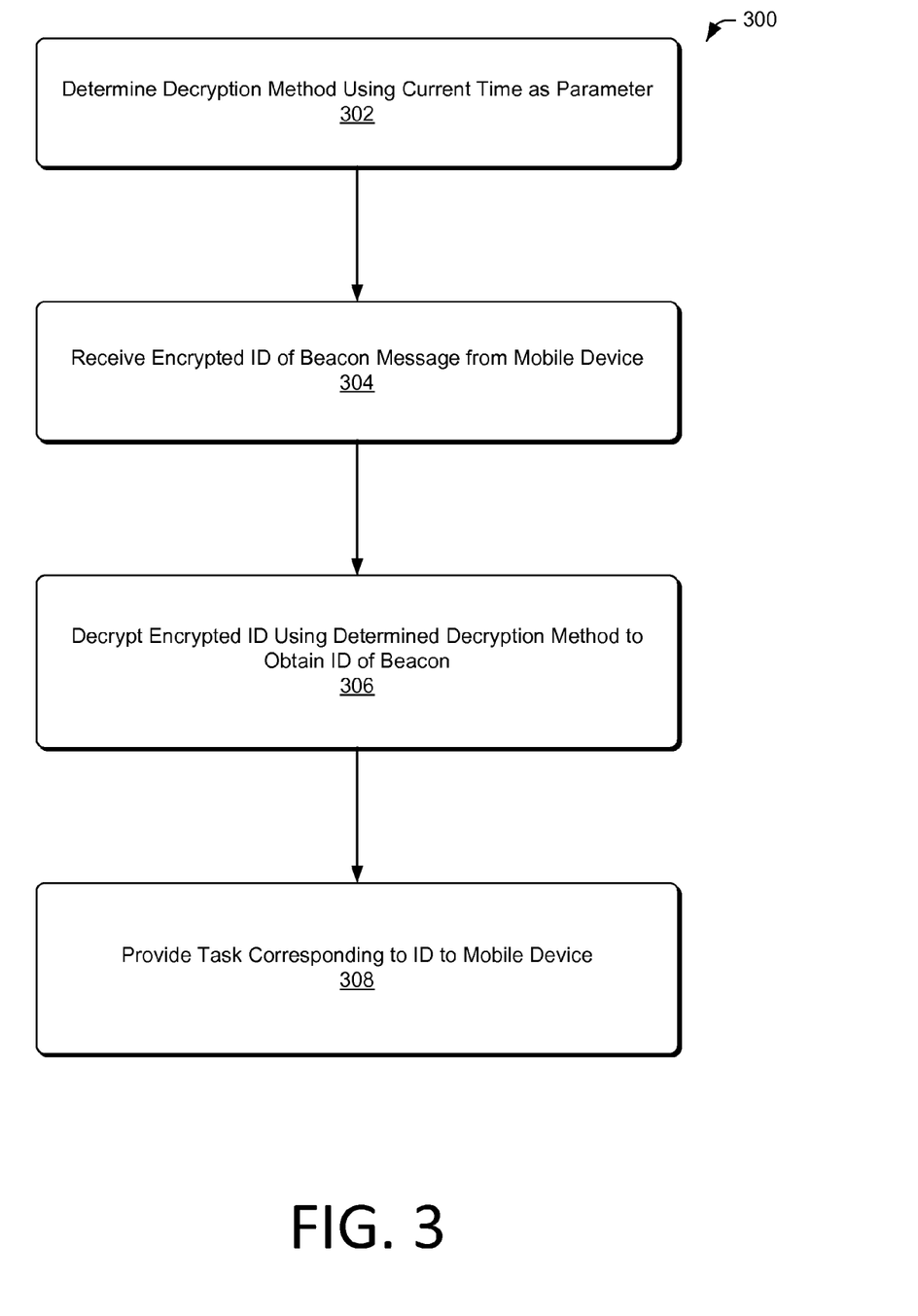
FIG. 3 is a flow chart of an illustrative process for providing a beacon-based service.

FIG. 3 is a flow chart of an illustrative process for providing a beacon-based service. At 302, the server 108 may determine, based on a predetermined algorithm, a decryption method using a current time as a parameter. In some implementations, decryption method may include a decryption algorithm and/or a private key.

In some implementations, the server 108 may preset N types of decryption methods. N is a natural number greater than 1. The server 108 may map the current time to M using a predetermined mapping algorithm and designate a decryption method corresponding to M as the determined encryption method. M is a nature number, greater than or equal to 1, and less than N. Since the decryption method associated with the server 108 corresponds to the encryption method associated with the beacon 102, the server 108 may determine the decryption method based on the encryption method that is determined and/or designated by the beacon 102.

At 304, the server 108 may receive an encrypted message including the encrypted ID of the beacon 102. For example, the mobile device 106 may receive the radio frame and retrieve information of the server 108 as well as the encrypted message from the radio frame. The mobile device 106 may transmit the encrypted message including the encrypted ID of the beacon 102 to the server 108.

At 306, the server 108 may obtain the ID of the beacon 102 based on the decryption method corresponding to the encrypted ID of the beacon 102. In addition to the ID of the beacon 102, the server 108 may decrypt other beacon information, such as a location code of the beacon 102 and equipment information of the beacon 102.

At 308, the server 108 may determine information of a task (e.g., a service) corresponding to the ID of the beacon 102 and transmit the information to the mobile device 106. In some implementations, the server 108 may identify and/or locate a task corresponding to the ID of the beacon 102, and transmit the information of the task to the mobile device 106. For example, the server 108 may store information of a store associated with the beacon 102. The information may include services provided by the store to a customer. The server 108 may obtain the ID of the beacon 102, identify and/or locate the store associated with the beacon 102, and provide to the customer with the information of the services associated with the store.

Since the mobile device 106 may transmit the ID of the beacon 102 and additional information to the server 108, the server 108 may provide detailed and accurate information of services to the mobile device 106. In some implementations, the server 108 may further facilitate the services based on additional information transmitted from the mobile device 106 to the server 108. The additional information may include at least one of location of the beacon 102, equipment information of the beacon 102, environment information (e.g., weather and traffic) associated with the beacon 102, or device information associated with the mobile device 106.

Suppose that the beacon 102 is a Bluetooth beacon (e.g., iBeacon®). Asymmetric encryption and decryption algorithms (e.g., RSA) may be performed on the UUID of the beacon 102. These algorithms may be performed on the beacon 102 and the server 108 respectively. In some instance, the encryption method of the server 108 and the beacon 102 may be a private key and a public key, respectively. The private key and the public key may be determined based on the current date. In some implementations, the beacon 102 may preset K public keys, and the server 108 may preset K private keys. In these instances, the K public keys correspond to the K private keys. An individual public key and the corresponding private key may be adopted by the beacon 102 and the server 108 respectively. The beacon 102 and the server 108 may further modify the individual public key and the corresponding individual private key respectively.

In some implementations, K public keys and current time may be stored in the beacon 102. The beacon 102 may determine and/or set a private key based on the current time and a predetermined algorithm. The beacon 102 may further encrypt UUID and transmit information including the encrypted message and information associated with the server 108 to the mobile device 106.

Since the beacon 102 may transmit radio frames at a fixed frequency, the beacon 102 may determine the number of radio frames that the beacon 102 sends out at a certain time. Therefore, the beacon 102 may determine whether the private key need to be modified. In some implementations, the beacon 102 may modify the private key in response to a determination that the number of radio frames is equal to a total number of radio frames that are allowed to be transmitted per day. The beacon 102 may then modified the encryption method, and recount the number of radio frames. On an initial day, an initial number may be determined based on the current time and the transmission frequency of radio frames such that the number of radio frames may reach the total number of radio frames allowed to be transmitted per day at zero clock of the next day.

After the initial setting, the beacon 102 may enter an auto mode. In some implementations, the beacon 102 may transmit radio frames at a predetermined frequency. In response to a determination that a number of radio frame transmissions is equal to a total number of radio frame transmissions allowed to be transmitted per day, the beacon 102 may adopt the new private key next to the current private key. The beacon may encrypt the UUID and other parameters using the new private key to obtain a new encrypted message. The beacon 102 may enter a new broadcast day. When the mobile device 106 receives the radio frame from the beacon 102, the mobile device 106 may retrieve information of the decryption server (e.g., the server 108) as well as the encrypted message including the UUID and other parameter. The mobile device 106 may then transmit the encrypted message to the server 108.

After the server 108 receives the encrypted message, the server 108 may, based on the current date and a predetermined algorithm, determine and/or locate the corresponding private key to decrypt the encrypted message to obtain the UUID and other parameters associated with the beacon 102. The server 108 may determine a task corresponding to the UUID, and transmit information of the task to the mobile device 106.

Implementations of this present disclosure may encrypt the ID of the beacon 102 and generate an encrypted message that may be modified with time. Even though a third party may obtain the encrypted message, it would be difficult for the third party to obtain information associated with the beacon 102 since the encrypted message change with the time. Further, the third party may not be able to steal sensitive information from the mobile device 106. Similarly, unauthorized applications on the mobile device 106 may merely obtain the encrypted message, and the information encrypted in the encrypted message may not be obtained by the unauthorized applications.

Figure 4:
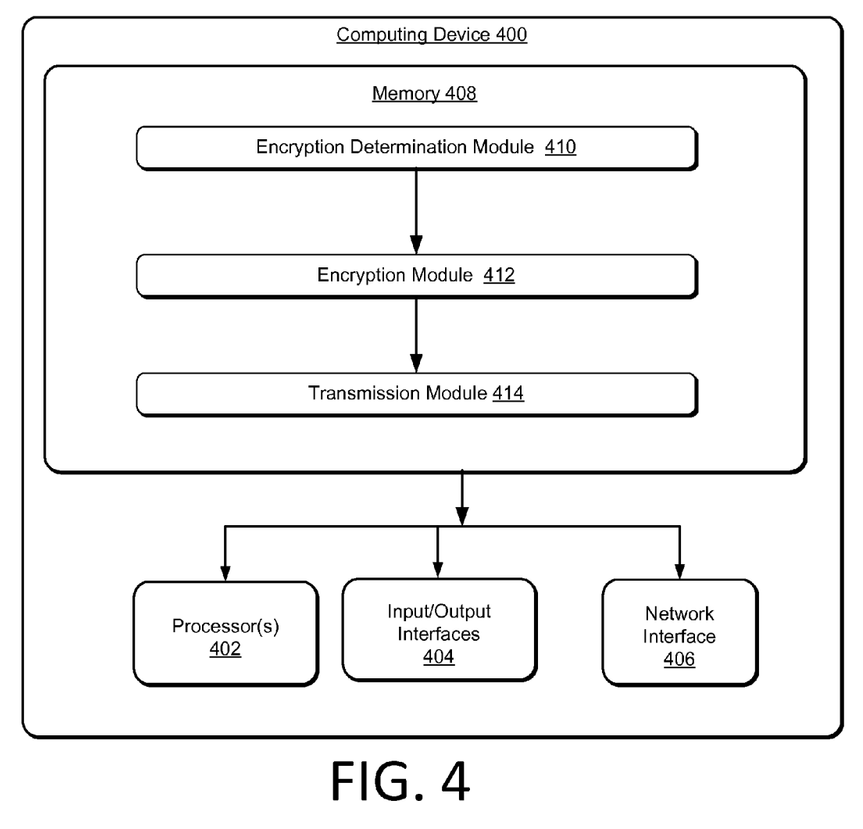
FIGS. 4 and 5 are schematic diagrams of illustrative computing architectures that enable transmission of a beacon message.
Figure 5:
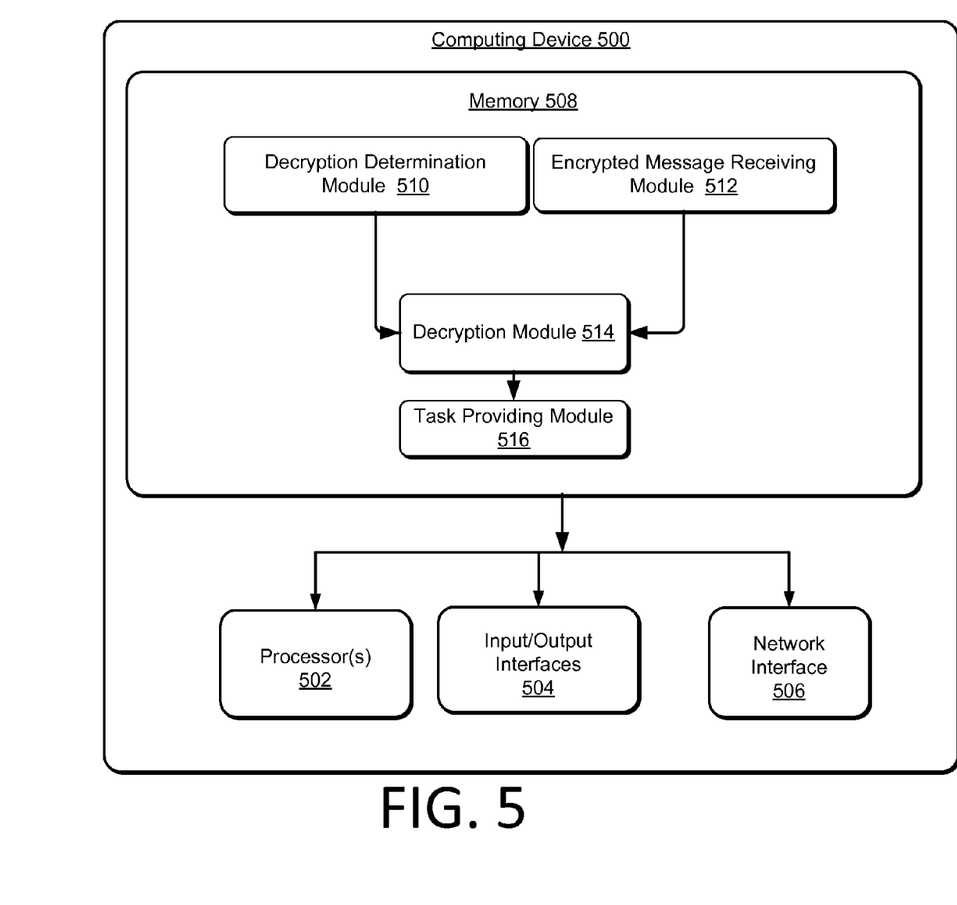

FIGS. 4 and 5 are schematic diagrams of illustrative computing architectures that enable transmission of a beacon message. FIG. 4 is a diagram of a computing device 400 (e.g., the beacon 102). The computing device 400 may be a user device or a server for a multiple location login control. In one exemplary configuration, the computing device 400 includes one or more processors 402, input/output interfaces 404, network interface 406, and memory 408.

The memory 408 may include computer-readable media in the form of volatile memory, such as random-access memory (RAM) and/or non-volatile memory, such as read only memory (ROM) or flash RAM. The memory 408 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 408 in more detail, the memory 408 may include an encryption determination module 410, an encryption module 412, and a transmission module 414.

The encryption determination module 410 is configured to determine, based on a predetermined algorithm, an encryption method using a current time as a parameter. The encryption module 412 is configured to encrypt an ID of a beacon using the determined encryption to obtain an encrypted ID of the beacon. The transmission module 414 is configured to generate a radio frame including the encrypted ID and information associated with a decryption computing device (e.g., the server 108), and transmit the radio frame to the mobile device 106.

In some implementations, the encryption determination module 410 may include an encryption presetting module, an encryption mapping module, and an encryption selecting module. The encryption presetting module is configured to preset N types of encryption methods. N is a natural number greater than 1. The encryption mapping module is configured to map the current time to M using a predetermined mapping algorithm. M is a nature number, greater than or equal to 1, and less than N. The encryption selecting module is configured to designate an encryption method corresponding to M as the determined encryption method.

In some implementations, the encryption method is a public key, and wherein the current time is a current date. In some instances, the encryption determination module 410 may include a total counting module, a counting module, and an encryption modification module. The total counting module is configured to determine a total number of transmission times of radio frames in a day based on a radio transmission frequency. The counting module is configured to count a number of transmission times of the radio frames based on the current time and the radio transmission frequency. The encryption modification module is configured to modify the encryption method based on the predetermined algorithm in response to a determination that the number of transmission times is equal to the total number of transmission times, and recount the number of transmission times. In some implementations, the encryption method may include a private key and/or an encryption algorithm.

FIG. 5 is a diagram of a computing device 500 (e.g., the server 108). The computing device 500 may be a user device or a server for a multiple location login control. In one exemplary configuration, the computing device 500 includes one or more processors 502, input/output interfaces 504, network interface 506, and memory 508.

The memory 508 may include computer-readable media in the form of volatile memory, such as random-access memory (RAM) and/or non-volatile memory, such as read only memory (ROM) or flash RAM. The memory 508 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 508 in more detail, the memory 508 may include a decryption determination module 510, an encrypted message receiving module 512, a decryption module 514, and a task providing module 516. The decryption determination module 510 is configured to determine, based on a predetermined algorithm, a decryption method using a current time as a parameter. The encrypted message receiving module 512 is configured to receive an encrypted ID of a beacon from a mobile device. The decryption module 514 is configured to decrypt the encrypted ID using the determined decryption method to obtain an ID of the beacon. The task providing module 516 is configured to provide a task corresponding to the ID to the mobile device.

In some implementations, the server 108 may preset N types of decryption methods. N is a natural number greater than 1. The server 108 may map the current time to M using a predetermined mapping algorithm and designate a decryption method corresponding to M as the determined decryption method. M is a nature number, greater than or equal to 1, and less than N.

Under conventional techniques, beacons transmit radio frames without encryption. Implementations of the present disclosure may encrypt the ID of the beacon 102, and modify the encryption method with time. Accordingly, applications unauthorized by the beacon 102 may not obtain a stable ID of the beacon 102; an unauthorized service may not be provided via the beacon 102. This avoids not only disclosure of sensitive information of customers but also beacon message theft.

The implementations are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method implemented by a beacon comprising one or more processors, the method comprising:
   determining an encryption method from among N types of encryption methods using a current time as a parameter, wherein N is a natural number greater than one, the N types of encryption methods comprise at least a symmetric encryption algorithm and an asymmetric encryption algorithm, and the determining comprises:
   mapping the current time to M using a predetermined mapping algorithm, M being another natural number greater than or equal to one and less than N, and
   designating an encryption method corresponding to M as the determined encryption method from among the N types of encryption methods;
   encrypting an identifier of the beacon using the determined encryption method to obtain a beacon message comprising an encrypted identifier of the beacon;
   generating a radio frame comprising the beacon message and information associated with a decryption computing device;
   transmitting the radio frame to a mobile device;
   determining a total number of transmission times of radio frames in a day based on a radio transmission frequency;
   counting a number of transmission times of the radio frames based on the current time and the radio transmission frequency;
   modifying the encryption method in response to a determination that the counted number of transmission times is equal to the total number of transmission times; and
   recounting the number of transmission times.

2. The method of claim 1, wherein the determined encryption method comprises the symmetric encryption algorithm or the asymmetric encryption algorithm.

3. The method of claim 1, wherein the beacon message further comprises information associated with the beacon, the information associated with the beacon comprising at least one of a location of the beacon, a configuration of the beacon, a service associated with the beacon, or a hardware parameter of the beacon.

4. A system comprising:
   one or more processors;
   memory;
   an encryption determination module stored in the memory and executable by the one or more processors to determine an encryption method from among a plurality of different encryption methods using a current time as a parameter by mapping the current time to a particular natural number using a predetermined mapping algorithm and designating a particular encryption method corresponding to the particular natural number as the determined encryption method from among the plurality of different encryption methods;
   an encryption module stored in the memory and executable by the one or more processors to encrypt an identifier of a beacon using the determined encryption method to obtain a beacon message comprising an encrypted identifier of a beacon;
   a transmission module stored in the memory and executable by the one or more processors to:
      generate a radio frame comprising the beacon message and information associated with a decryption computing device, and
      transmit the radio frame to a mobile device;
   a total counting module stored in the memory and executable by the one or more processors to determine a total number of transmission times of radio frames in a day based on a radio transmission frequency;
   a counting module stored in the memory and executable by the one or more processors to count a number of transmission times of the radio frames based on the current time and the radio transmission frequency; and
   an encryption modification module stored in the memory and executable by the one or more processors to modify the encryption method in response to a determination that the counted number of transmission times is equal to the total number of transmission times, and recount the number of transmission times.

5. The system of claim 4, wherein the determined encryption method comprises a symmetric encryption algorithm or an asymmetric encryption algorithm.

6. The system of claim 4, wherein the beacon message further comprises information associated with the beacon, the information associated with the beacon comprising at least one of a location of the beacon, a configuration of the beacon, a service associated with the beacon, or a hardware parameter of the beacon.

7. A method comprising:
   determining an encryption method from among a plurality of different encryption methods using a current time as a parameter by mapping the current time to a particular natural number using a predetermined mapping algorithm and designating a particular encryption method corresponding to the particular natural number as the determined encryption method from among the plurality of different encryption methods;

encrypting an identifier of a beacon using the determined encryption method to obtain a beacon message comprising an encrypted identifier of a beacon;

generating a radio frame comprising the beacon message and information associated with a decryption computing device, and transmitting the radio frame to a mobile device;

determining a total number of transmission times of radio frames in a day based on a radio transmission frequency;

counting a number of transmission times of the radio frames based on the current time and the radio transmission frequency; and modifying the encryption method in response to a determination that the counted number of transmission times is equal to the total number of transmission times, and recount the number of transmission times.

8. The method of claim 7, wherein the determined encryption method comprises a symmetric encryption algorithm or an asymmetric encryption algorithm.

9. The method of claim 7, wherein the beacon message further comprises information associated with the beacon, the information associated with the beacon comprising at least one of a location of the beacon, a configuration of the beacon, a service associated with the beacon, or a hardware parameter of the beacon.

10. One or more computer-readable media storing executable instructions that, when executed by one or more processors, cause the one or more processor to perform acts comprising:

determining an encryption method from among a plurality of different encryption methods using a current time as a parameter by mapping the current time to a particular natural number using a predetermined mapping algorithm and designating a particular encryption method corresponding to the particular natural number as the determined encryption method from among the plurality of different encryption methods;

encrypting an identifier of a beacon using the determined encryption method to obtain a beacon message comprising an encrypted identifier of a beacon;

generating a radio frame comprising the beacon message and information associated with a decryption computing device, and transmitting the radio frame to a mobile device;

determining a total number of transmission times of radio frames in a day based on a radio transmission frequency;

counting a number of transmission times of the radio frames based on the current time and the radio transmission frequency; and modifying the encryption method in response to a determination that the counted number of transmission times is equal to the total number of transmission times, and recount the number of transmission times.

11. The one or more computer-readable media of claim 10, wherein the determined encryption method comprises a symmetric encryption algorithm or an asymmetric encryption algorithm.

12. The one or more computer-readable media of claim 10, wherein the beacon message further comprises information associated with the beacon, the information associated with the beacon comprising at least one of a location of the beacon, a configuration of the beacon, a service associated with the beacon, or a hardware parameter of the beacon.

* * * * *